May 18, 1971 W. J. SCHRENK 3,579,416
PACKAGING FILM COMPRISING POLYOLEFIN OUTER LAYERS AND
PLURAL INNER GAS BARRIER LAYERS
Filed Dec. 19, 1966
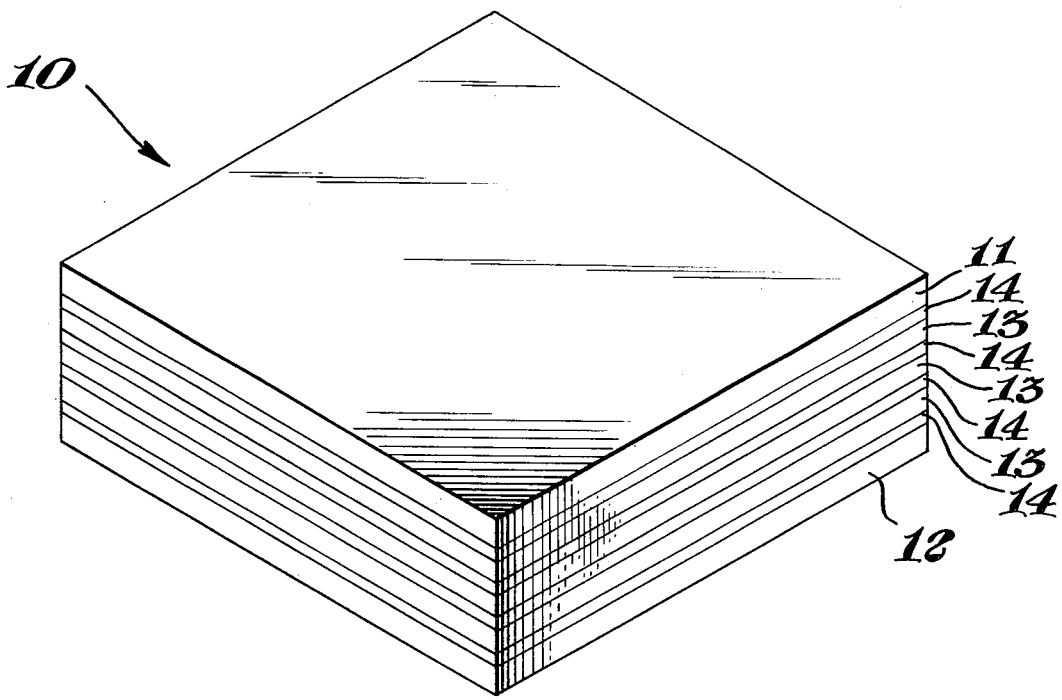
INVENTOR.
Walter J. Schrenk
BY
AGENT United States Patent Office 3,579,416
Patented May 18, 1971

3,579,416
PACKAGING FILM COMPRISING POLYOLEFIN OUTER LAYERS AND PLURAL INNER GAS BARRIER LAYERS
Walter J. Schrenk, Bay City, Mich., assignor to The Dow Chemical Company, Midland, Mich.
Filed Dec. 19, 1966, Ser. No. 602,899
Int. Cl. B32b 27/08, 27/30, 27/32
U.S. Cl. 161—254                                  6 Claims

ABSTRACT OF THE DISCLOSURE

A packaging film is claimed which incorporates a gas barrier core such as vinylidene chloride polymer, the gas barrier core is slit into a plurality of layers which provides improved barrier properties and crumple resistance over a single layer core.

This invention relates to an improved packaging film, and more particularly relates to an improved multilayer packaging film.

Many synthetic resinous thermoplastic flexible packaging films are known. In general, none of such films possess all of the desirable properties for many packaging applications. Two and three layer packaging films have been prepared wherein one or both of the external surfaces is of a heat sealable composition and a centrally disposed layer is provided to serve as a gas or moisture vapor barrier. Usually, such films are prepared by the simultaneous extrusion of a composite stream in either sheet or tubular form to provide the desired product. In many instances, the external surface or surfaces of the composite film are comprised of a synthetic resinous material which has a relatively low heat sealing temperature, whereas the central portion of the composite film or sheet is composed of a barrier material such as a vinylidene chloride polymer. In some instances, packaging films prepared by the simultaneous extrusion of two or three diverse synthetic resinous materials employing apparatus such as is illustrated in British Pat. No. 985,310 and in Italian Pat. No. 522,838 provide a composite structure of improved utility. However, oftentimes, such composite materials are less than ideally desirable for many applications. An extremely important characteristic of the packaging film for many applications is gas or moisture vapor characteristics of the composite film. Usually, when employing polyolefins and vinylidene chloride polymers, the total barrier characteristic is almost solely dependent on the barrier properties of the vinylidene chloride employed, as the gas transmission rate through the polyolefin is very much greater than the gas transmission rate through the vinylidene chloride polymer. Such composite structures have the inherent defect of having poor crumple resistance, that is, when a portion of the film is crumpled, the barrier properties are significantly and substantially reduced. Generally, it is desirable to maintain the barrier layer such as a vinylidene chloride polymer layer as thin as possible in order to take advantage of the toughness and abrasion resistance of the polyolefin employed. The barrier resin generally is a higher melting point material which oftentimes does not heat seal readily and frequently is thermally sensitive. It is desirable in the preparation of a packaging film having a desired gas transmission rate that the proportion of the vinylidene chloride polymer be maintained as low as possible.

It would be desirable if there were available an improved flexible transparent packaging film having improved gas transmission properties.

It would also be desirable if there were available an improved packaging film having high impact resistance.

It would also be desirable if there were available a packaging film having improved impact resistance, gas transmission characteristics and crumple resistance.

These benefits and other advantages in accordance with the present invention are achieved in a packaging film comprising first and second surface layers, the first and second surface layers being a polymer of an olefin having from 2–6 carbon atoms and one reactive double bond, a gas barrier layer of a synthetic resinous thermoplastic material disposed between the first and second surfaces, the gas barrier layer comprising a plurality of layers of a gas barrier material separated from each other and adhered together to form a unitary body.

The figure schematically depicts a view of a portion of the film in accordance with the invention.

In the figure there is depicted schematically a view of a synthetic resinous packaging film in accordance with the present invention generally designated by the reference numeral 10. The packaging film 10 comprises a first surface layer 11 of a heat sealable polyolefin polymer, a second surface layer 12 of a heat selable polyolefin polymer, a plurality of layers 13 of a synthetic resinous material with desirable barrier characteristics, that is, low gas transmission values and low moisture vapor transmission values, a plurality of adhesive layers 14 disposed between the barrier layers 13 and adhering them together and adhering the barrier layer 13 to the surface layers 11 and 12.

Packaging films in accordance with the present invention are readily prepared by any multiple extrusion or simultaneous extrusion technique which results in a desired structure. They may be prepared either by extrusion as a flat sheet from a layered stream of heat plastified diverse polymers, or alternately, may be prepared as a tube and stretched.

In order to obtain a film having a desired adherence between the layers, it is generally desirable to combine a plurality of molten streams within a die to form them to a desired configuration and subsequently extrude in such a manner that the diverse synthetic resinous materials are disposed in a layered configuration. Various methods of producing such layered film are known in the art.

By the term "polyolefin" is meant polyethylene, polypropylene, resinous polymers of ethylene and propylene, polymers of ethylene and/or propylene with minor proportions of olefinically unsaturated monomers such as, for example, those α-olefins having from 2 to 8 carbon atoms such as 1-butene, 1-pentene, 1-hexene, 1-heptene, 1-octene and mixed higher α-olefins. Other hydrocarbons useful for making polymers with ethylene and propylene include divinylbenzene, allene, dimethallyl and isopentene. Comonomers which can broadly be used include monosubstituted ethylenes such as 1-pentene, vinylcyclohexene, allyl benzene, $C_8$–$C_{14}$ mixed α-olefins, styrene, allyl naphthalene and the like, 1,1-disubstituted ethylenes such as α-methyl styrene, 2-methylbutene-1, mixed α- and β-pinenes, camphene and the like, 1,2-disubstituted ethylenes such as indene, acenaphthylene, cyclopentene, norbonylene, cyclohexene, trans-stilbene, 2-pentene and the like, conjugated dienes and trienes such as pentadiene-1,3, 1,2-dihydrobenzene, allo-ocimene, and cyclopentadiene, unconjugated dienes such as mixed octadienes, hexadiene-1,5, 2,5-dimethylhexadiene-1,5, 1,4-dihydrobenzene, bicycloheptadiene, bicyclopentadiene, 4-vinylcyclohexene-1 and 4,7-diphenyl decadiene-1,9-acetylenes such as isopropenyl acetylene and phenyl acetylene, chloro-olefins such as β-methallyl chloride and chloromethyl norbornylene, and m-chlorostyrene, ethers and epoxides, esters such as vinyl butyrate, vinyl acetate and methyl acrylate, and nitrogen compounds such as vinyl carbazole, 4-vinyl pyridine and acrylonitrile and mixtures and blends thereof.

A wide variety of barrier materials may be employed in the central layer of films in accordance with the present invention. Particularly suited as barrier layers are combinations of vinylidene-chloride polymers, vinyl-chloride polymers, vinylidene-fluoride polymers and extrudable mixtures thereof. The requirement for the central layer is that the material be extrudable within a sheath of another polymer and that the composition have the desired gas and moisture vapor transmission barrier characteristics. Particularly advantageous and beneficial are extrudable compositions of vinylidene-chloride polymers, wherein the polymers contain at least about 70 weight percent vinylidene-chloride, the remainder being one or more olefinically unsaturated monomers copolymerizable therewith. Suitable vinylidene chloride polymers are prepared utilizing such comonomers as methyl, ethyl, isobutyl, butyl, octyl and 2-ethylhexyl acrylates and methacrylate; phenyl methacrylate, cyclohexyl methacrylate, p-cyclohexylphenyl methacrylate, chloroethyl methacrylate, 2-nitro-2-methylpropyl methacrylate and the corresponding esters of acrylic acid; methyl $\alpha$-chloroacrylate, octyl $\alpha$-chloroacrylate, methyl isopropenyl ketone, acrylonitrile, methacrylonitrile, methyl vinyl ketone, vinyl chloride, vinyl acetate, vinyl propionate, vinyl chloroacetate, vinyl bromide, styrene, vinyl naphthalene, ethyl vinyl ether, N-vinyl phthalimide, N-vinyl succinimide, N-vinyl carbazole, isopropenyl acetate, acrylamide, methacrylamide or monoalkyl substitution products thereof, phenyl vinyl ketone, diethyl fumarate, diethyl maleate, methylene diethyl malonate, dichlorovinylidene fluoride, dimethyl itaconate, diethyl itaconate, dibutyl itaconate, vinyl pyridine, maleic anhydride and allyl glycidyl ether. Commercially available light stabilizers may also be incorporated in the vinylidene chloride material such as tertiarybutyl salol. Other barrier compositions which may be used with benefit in films in accordance with the present invention are vinyl chloride polymers which contain a predominant amount of vinyl chloride therein, and beneficially, fluorocarbon polymers, fluorohydrocarbon polymers and fluorohalohydrocarbon polymers may also be used with benefit. Such materials as polyvinyl chloride, polyvinylidene fluoride, chlorinated polyethylene and polymers of such materials as vinylidene fluoride, vinylidene fluoride and chlorotrifluoroethylene, chlorotrifluoroethylene and vinylidene fluoride, chlorotrifluoroethylene and vinyl chloride, chlorotrifluoroethylene-vinylidene fluoride and tetrafluoroethylene and the like. Generally, for economic reasons, the vinylidene chloride polymers are employed, as they are most readily available at relatively low cost.

Beneficially, in the extrusion of the vinylidene polymers, it is frequently advantageous and beneficial to incorporate therein a minor portion of a plasticizer, oftentimes a heat stabilizer and a light stabilizer. Such additives are well known in the art and generally are found advantageous in that the temperature required for the extrusion is substantially reduced and the probability of decomposition of the polymer in an extruder is lowered. Typical plasticizers which are employed in the vinylidene or Saran combinations are acetyl tributyl citrate, epoxidized soyabean oil (commercially available under the trade designation of Paraplex G–60), dibutyl sebacate and the like.

In the preparation of articles in accordance with the present invention, it is essential that the barrier material be provided as a plurality of layers, that is, two or more separate and distinct layers disposed within the packaging film and disposed generally parallel to the surface thereof. Beneficially, such layers are readily adhered to each other by separate adhesive layers if their natural adhesion on simultaneous extrusion is low.

Beneficially, in certain instances, it is desirable to add adhesive or bonding layers between the barrier layer and the outer polyolefin layer. The nature of such bonding or adhesive layers must be such that the adhesion between the outer and inner layer is increased as increased seal strength and resistance to delamination are to be obtained.

A variety of polymers may be employed for the purpose and coextruded simultaneously as the film is formed to provide multilayer film, wherein the outer layers are of a polyolefin layer, such as polyethylene, polypropylene, the resinous polymers of ethylene and propylene and the like.

Beneficially, the adhesive layer will vary in thickness from about 0.05 to about 0.8 mil; however, generally the preferred range of adhesive layer thickness is from about 0.1 to about 0.3 mil in thickness. Oftentimes, the strength of the bond between the inner or core layer and the outer or surface layer increases slowly as the thickness of the adhesive layer is increased, and generally, little or no increase in the bond strengths occurs after the thickness of the bonding layer has reached 0.5 to 0.6 mil.

A wide variety of polymers and polymeric compositions are useful to increase the adhesion between the polyolefin outer layer and the inner barrier layer. Suitable polymers or polymeric compositions are readily selected by determining the bonding strength of the composition being evaluated by forming a two-layer extrusion. The bond strength of the resultant two-layer laminate is readily determined by conventional peel strength tests. Similarly, the adhesive layer composition is evaluated by a similar extrusion utilizing the polyolefin material.

In the instance of adhering layers of polyolefins such as polyethylene and polypropylene to vinylidene chloride polymers, polymers which are particularly advantageous are polymers from about 13 weights percent to about 35 weight percent vinyl acetate with from about 87 weight percent to about 65 weight percent ethylene, polymers of from about 20 to 30 weight percent ethylacrylate with from about 80 to 70 weight percent ethylene, polymers from about 20 to 30 weight percent isobutyl acrylate with from about 80 to 70 weight percent of ethylene, chlorinated polyethylene containing from about 15 to 40 weight percent chloride; also, terpolymers of ethylene with acrylic acid, vinyl acetate, isobutyl acrylate, ethylacrylate, the total of the non-ethylene monomers being from about 20 to about 30 weight percent based on the weight of the total monomers.

It is essential and critical that the barrier layer be divided into a plurality of generally parallel components extending parallel to the major surface of the resultant film or sheet. It is extremely desirable that the thickness of the barrier layer be maintained between about one micron and 10 microns. If the thickness of the barrier layers is less than about one micron, optical effects occur which, in certain instances, may be undesirable. If the thickness of the barrier layers is greater than 10 microns, the barrier properties are reduced as is the resistance to impact and crumpling. The thickness of structures in accordance with the present invention beneficially may vary from about ½ to about 10 mils and preferably from about 1 to about 7 mils depending upon the end use desired.

The invention is further illustrated but not limited by the following examples:

EXAMPLE 1

A 2.5-mil thick flexible composite film is prepared consisting of 10 layers of a polymer of 85 weight percent vinylidene chloride and 15 weight percent vinyl chloride each 2 microns in thickness; adhered together and separated by 9 interleaved layers of a polymer of 24 parts by weight of isobutyl acrylate and 76 parts by weight of ethylene, each having a thickness of 1.5 microns; and two surface layers of polyethylene each 10 microns thick, and is adhered to the vinylidene chloride barrier resin core by means of two layers of the ethylene isobutyl acrylate polymer each 5 microns thick. The film is produced by chill roll casting from a sheeting die. Evaluation of the film indicates an oxygen transmission rate of less than 1 cc. per 100 square inch per atmosphere per 24 hours. The resultant film is crumpled at a temperature of 0° C. and subsequently evaluated for oxygen transmission. No significant change in the oxygen transmission rate is observed. A bag is fabricated from the film by heat sealing and filled with one pound of dried navy beans. Evaluation for impact resistance by dropping the bag indicates improved impact properties over a similar film having a like quantity of vinylidene chloride polymer as a single layer in the core.

EXAMPLE 2

A 2-mil thick flexible film is prepared in a manner similar to the procedure of Example 1 having 15 layers of a polymer of 85 weight percent vinylidene chloride and 15 weight percent vinyl chloride. Each of the layers has a thickness of one micron. The vinylidene chloride polymer layers are separated and adhered together by 14 layers of a polymer of 75 weight percent ethylene and 25 weight percent vinyl acetate. Each ethylene polymer layer is one micron in thickness. On either side of the outermost layers of vinylidene chloride polymer layers are disposed 5 micron thick layers of the ethylene vinyl acetate polymer and outer or surface layers of low density polyethylene, each layer being 6 microns thick. The composite film has an oxygen transmission rate of about 1 cc. per 100 square inch per atmosphere per 24 hours and shows excellent resistance to pin holding under severe crumpling at 0° C. and excellent impact resistance as evaluated by overwrapping one pound of dried navy beans and subjecting the resultant package to repeated impact.

EXAMPLE 3

The procedure of Example 2 is repeated with the exception that in place of the ethylene-vinyl acetate polymer, a chlorinated polyethylene containing 35 weight percent chlorine is employed. The resultant flexible film is extremely tough and puncture resistant at room temperature as well as at 0° C. Barrier properties are generally unchanged and the oxygen transmission rate is less than abuot 1 cc. per 100 square inches per atmosphere per 24 hours.

EXAMPLE 4

A 1.5-mil thick flexible film is prepared by simultaneous extrusion. The film consists of three layers of a polymer of 85 weight percent vinylidene chloride, 15 weight percent vinyl chloride, each layer being 3.3 microns in thickness. These layer are separated and adhered together by two layers 2 microns thick of a polymer of 80 weight percent ethylene and 20 weight percent vinyl acetate. Disposed on either side of the barrier core of vinylidene chloride polymer layers and ethylene polymer layers are layers, 5 microns thick, of ethylene-vinyl acetate polymers, and surface layers of polyethylene having a thickness of about 0.25 mil. Somewhat inferior characteristics are observed relative to the products of Examples 1, 2 and 3.

EXAMPLE 5

A 2-mil thick multilayer composite flexible film is prepared by simultaneous extrusion of 15 layers of a polymer of 85 weight percent vinylidene chloride and 15 weight percent vinyl chloride, each of the layers being about one micron in thickness. The layers are separated by 14 layers of a thermoplastic polyurethane sold under the trade designation of Estane by the B. F. Goodrich Company; each of the layers are about one micron in thickness. The outer surfaces of the composite film are a thermoplastic polyurethane approximately 11 microns thick. The resultant laminate is fabricated into bags, the bags filled with liquid and evaluated for impact resistance by dropping from a height of 20 feet. Excellent impact resistance is observed as well as excellent crumple resistance and oxygen barrier properties.

EXAMPLE 6

A 3-mil thick composite flexible film is prepared by simultaneous extrusion. The composite film consists of 10 layers, each 2 microns thick, of a polymer of 85 weight percent vinylidene chloride and 15 weight percent vinyl chloride. Each of the vinylidene chloride layers are separated and adhered to adjacent layers by a layer of the thermoplastic polyurethane of Example 5. The 9 polyurethane layers are each about 1.5 microns thick. Disposed on either side of the vinylidene chloride polyurethane layers is a 6 micron thick layer of a polymer of 70 weight percent ethylene and 30 weight percent vinyl acetate. The surface layers of the composite film are about 15 microns in thickness and consist of polyethylene. Evaluation of the composite film indicates slight loss of impact properties relative to that of Example 5, but the film is more readily heat sealable and is readily handled in automatic packaging equipment. Excellent gas and moisture vapor barrier characteristics are obtained.

EXAMPLE 7

The procedure of Example 6 is repeated with the exception that the polyurethane is replaced with chlorinated polyethylene containing about 35 weight percent chlorine. The resultant film is slightly less tough than the film produced in Examples 5 and 6, but shows excellent crumple resistance and oxygen and moisture vapor barrier characteristics.

EXAMPLE 8

A multilayer blown flexible film is prepared employing a trapped bubble process. The film consists of a central core comprising alternating layers of a polymer of 85 weight percent vinylidene chloride and 15 weight percent vinyl chloride and layers of a polymer of 73 weight percent ethylene and 27 weight percent vinyl acetate, the core contains approximately 18 layers of each polymer which vary in thickness from about 0.8 micron to 3.2 microns. The outer layers of the composite film are of polyethylene and are about 0.3 mil thick. The resultant film shows excellent tensile strength, impact resistance, low oxygen transmission rate and excellent crumple resistance.

EXAMPLE 9

By means of simultaneous extrusion, two 7-layer flexible films are prepared which consist of external layers 2.6 mils and 2 mils in thickness, respectively, each film having a central core consisting of a layer of a polymer of 75 weight percent ethylene and 25 weight percent vinyl acetate having on either side thereof a layer of a polymer of 85 weight percent vinylidene chloride and 15 weight percent vinyl chloride. In both films, each vinylidene chloride polymer layer has a thickness of about 0.29 mil. The outer surfaces of the film is polyethylene and the polyethylene is adhered to the vinylidene chloride polymer layers by means of a layer of the ethylene-vinyl acetate polymer.

For purposes of comparison, a film is prepared having a like quantity of polyethylene, ethylene-vinyl acetate polymer and vinylidene chloride polymer, with the exception that a single layer of vinylidene chloride polymer is centrally disposed and has a thickness of 0.58 mil. The results are set forth in the following table:

TABLE I

| Run No. | Vinylidene chloride resin layer thickness, mils | Total film thickness, mils | Vinylidene chloride layer | D.D. impact [1] at 15° F., ft. lb. | Percent improved, split vs. single |
|---|---|---|---|---|---|
| 1 | 0.29 | 2.60 | Split | 0.411 | |
| 2 | 0.33 | 3.00 | Single | 0.227 | 81 |
| 3 | 0.29 | 2.00 | Split | 0.311 | |
| 4 | 0.28 | 1.97 | Single | 0.103 | 200 |
| 5 | 0.39 | 2.80 | Split | 0.236 | |
| 6 | 0.32 | 3.00 | Single | 0.156 | 51 |

[1] D.D. Impact=Dart Drop Impact at 15° F.

EXAMPLE 10

Employing the proceduer of Example 1, a plurality of multilayer or layered flexible films are prepared, some containing two vinylidene chloride polymer layers, others containing one vinylidene chloride layer. In each case, the thickness of vinylidene chloride polymer is about equal. When the total vinylidene chloride layer has a thickness of 0.4 mil, the oxygen transmission rate for the samples having two layers of vinylidene chloride polymer is about one half of that for the samples containing one layer of vinylidene chloride polymer.

EXAMPLE 11

The general procedure of Example 10 is followed with the exception that a plurality of flexible films are prepared wherein some of the films have 6 vinylidene chloride layers and others have one. The results are set forth in the following table:

TABLE II

| Run No. | Thickness in mils | | | | Oxygen transmission rate, cc./100 in.² | Dart drop impact, 15° F., ft. lb. | Distance between vinylidene layers, mils |
|---|---|---|---|---|---|---|---|
| | Vinylidene chloride | Adhesive layer | Polyethylene | Total | | | |
| 7 | 0.37 | 0.50 | 0.98 | 1.85 | 1.87 | 0.0618 | ¹ 0 |
| 8 | 0.28 | 0.55 | 1.14 | 1.97 | 1.78 | 0.103 | ¹ 0 |
| 9 | 0.32 | 0.70 | 1.98 | 3.00 | 1.7 | 0.156 | ¹ 0 |
| 10 | 0.33 | 0.60 | 2.07 | 3.00 | 1.88 | 0.227 | ¹ 0 |
| 11 | 0.35 | 0.92 | 0.93 | 2.20 | 1.2 | 0.502 | 0.084 |
| 12 | 0.43 | 0.65 | 0.92 | 2.00 | 1.7 | 0.406 | 0.02 |
| 13 | 0.29 | 0.83 | 0.80 | 1.92 | 2.23 | 0.286 | 0.036 |
| 14 | 0.25 | 1.01 | 0.73 | 1.99 | 2.2 | 0.310 | 0.07 |
| 15 | 0.25 | 1.15 | 0.65 | 2.05 | 1.55 | 0.263 | 0.10 |

¹ One layer.

Oxygen transmission measurements indicated about an 80-percent improvement in oxygen transmission rate when 6 layers are employed instead of one layer.

In a manner similar to the foregoing examples, other composite layered flexible films are readily prepared wherein the barrier layer is split into a plurality of layers thereby providing improved gas and moisture vapor transmission properties, impact strength and crumple resistance.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention.

What is claimed is:

1. A thermoplastic multilayer flexible packaging film comprising:

first and second surface layers, the first and second surface layers being a polymer of an olefin having from 2–6 carbon atoms and one reactive double bond, a gas barrier layer of a synthetic resinous thermoplastic material disposed between the first and second surface layers, the gas barrier layer comprising at least three layers of a gas barrier material separated from each other and adhered together by a synthetic resinous material to form a unitary body lying between and adhered to the first and second surface layers.

2. The packaging film of claim 1 wherein gas barrier material is a vinylidene chloride polymer.

3. The packaging film of claim 1 wherein the surface layers are polyethylene.

4. The packaging film of claim 1 wherein the layers of gas barrier material are adhered together by means of a polymer of an olefin having from from 2–6 carbon atoms and one reactive double bond and a monoolefinically unsaturated carboxylic acid or ester.

5. The packaging film of claim 4 wherein the polymer of an olefin is a polymer of ethylene and vinyl acetate.

6. The packaging film of claim 1 wherein the surface layers heat seal at a temperature lower than the gas barrier layers.

References Cited

UNITED STATES PATENTS

| | | | |
|---|---|---|---|
| 2,543,229 | 2/1951 | Chapman | 161—251 |
| 3,218,224 | 11/1965 | Osborn | 161—247 |
| 3,232,784 | 2/1966 | Seibel et al. | 117—76 |
| 3,274,004 | 9/1966 | Curler et al. | 99—171 |
| 3,322,614 | 5/1967 | Seiferth et al. | 161—254 |
| 3,387,640 | 6/1968 | Butler | 150—7 |

JOHN T. GOOLKASIAN, Primary Examiner

D. J. FRITSCH, Assistant Examiner

U.S. Cl. X.R.

161—253, 255, 256